US006932860B1

(12) United States Patent
Morton

(10) Patent No.: US 6,932,860 B1
(45) Date of Patent: Aug. 23, 2005

(54) WAX EMULSION

(76) Inventor: Richard Joseph Morton, 4 Central Ave., Sausalito, CA (US) 94965

(*) Notice: Subject to any disclaimer, the term of this patent is extended or adjusted under 35 U.S.C. 154(b) by 0 days.

(21) Appl. No.: 10/609,214

(22) Filed: Jun. 27, 2003

(51) Int. Cl.[7] .............................. C09G 1/04; C09G 1/10
(52) U.S. Cl. ................... 106/3; 106/10; 106/11
(58) Field of Search ................... 106/3, 10, 11

(56) References Cited

U.S. PATENT DOCUMENTS 3,395,028 A * 7/1968 Mackles ................ 106/8
3,847,622 A * 11/1974 Brandl et al. ............ 106/10
4,013,475 A * 3/1977 Liebowitz et al. ......... 106/10

OTHER PUBLICATIONS

Turtle Wax Finish 2001 car polish information from Epinions.com.*
Information on Briwax from www.briwaxwoodcare.com.*

* cited by examiner

Primary Examiner—C. Melissa Koslow
(74) Attorney, Agent, or Firm—Risto A. Rinne, Jr.

(57) ABSTRACT

A finish for application over an article of furniture includes an emulsion that if formed by blending together an oil-based furniture type of wax with a water based automotive type of wax. The furniture wax is limited to less than one-third the total volume. This results in a furniture finish that resists smudging, smearing, and dust collection and is also easy to apply and durable. A deep luster similar to that obtained by the use of a quality furniture wax is obtained without the disadvantages thereof.

2 Claims, 1 Drawing Sheet

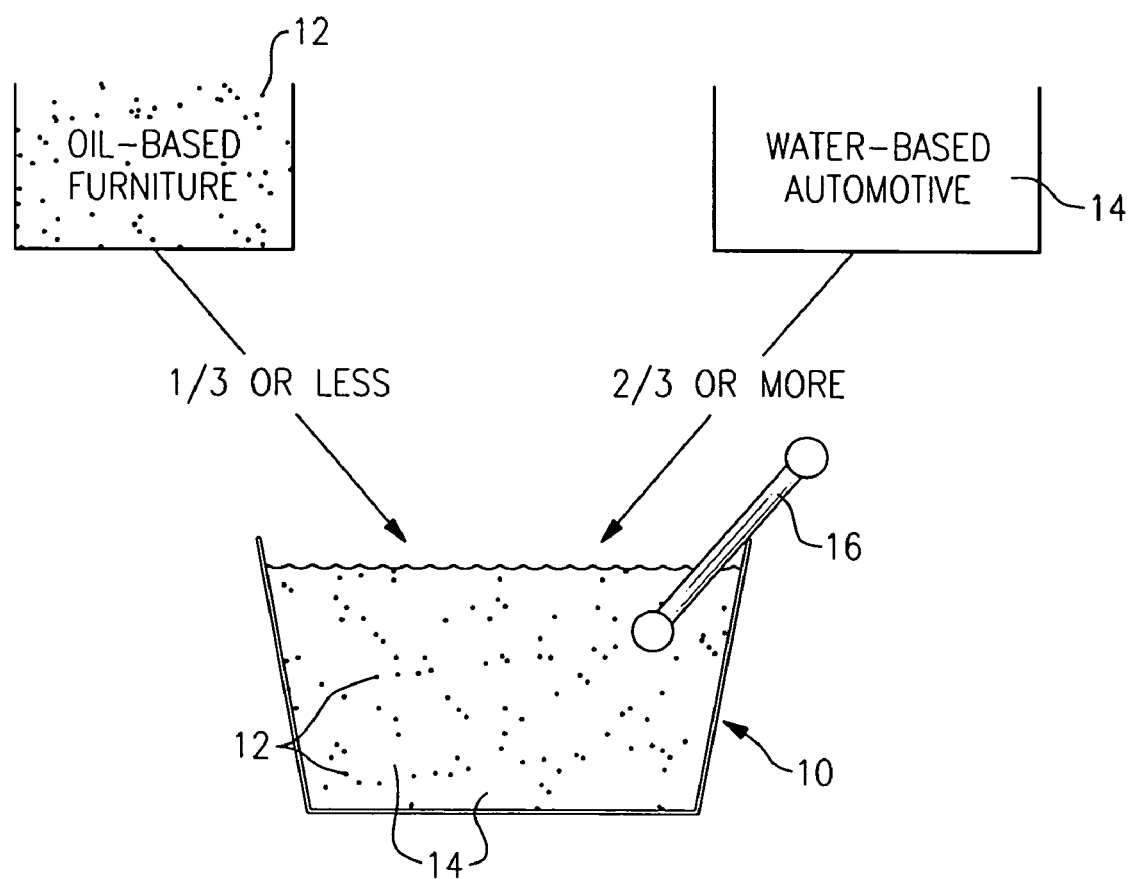

WAX EMULSION

BACKGROUND OF THE INVENTION

1. Field of the Invention

The present invention, in general relates to waxes and polishes and, more particularly, to a furniture wax.

Waxes are well known and are adapted for use with specific products. For example, water based polishes are commonly used on automobiles whereas oil based waxes are used on furniture.

Oil based waxes for furniture use have a few problems. One such problem is that if one were to rub a finger over a piece of waxed furniture, it would leave a smudge streak where the finger was passed. This can quickly render unattractive a piece of waxed furniture. This problem is even worse in furniture showrooms where the desire to touch and rub furniture is strong. As such, furniture showrooms are always having to re-wax their furniture to remove smudges.

While this problem is present for all types of furniture, it is especially troublesome for higher sheen lacquer types of finishes.

Also, some types of furniture wax tend to collect dust which can also quickly dull the appearance.

Water based polishes, such as automobile polishes, are not suitable for use on furniture because they do not provide a finish having a desirable thickness and aesthetic depth.

Accordingly, there exists today a need for a product, method and system for polishing furniture that cannot smudge and smear or collect dust as readily as do the present offerings.

Clearly, such a product would be a useful and desirable device.

2. Description of Prior Art

Waxes and polishes are, in general, known. Typically, they are either water based (i.e., silicon resin formulated automobile polishes) or they are oil based furniture waxes which may include either a carnauba wax or a bees wax component, either of which are not water soluble. While the structural arrangements of the above described devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a wax emulsion that is suitable for use on furniture.

It is also an important object of the invention to provide a wax emulsion that is suitable for use on a high sheen lacquer finished type of furniture.

Another object of the invention is to provide a wax emulsion that is suitable for use on furniture and which resists smudging.

Still another object of the invention is to provide a wax emulsion that is suitable for use on furniture and which resists smearing.

Still yet another object of the invention is to provide a wax emulsion that is suitable for use on furniture that resists either smudging or smearing when any portion of a hand is passed over it.

Yet another important object of the invention is to provide a wax emulsion that is suitable for use on furniture that will resist collecting dust.

Still yet another important object of the invention is to provide a wax emulsion that is suitable for use on furniture in which an oil-based wax is combined with a water based polish.

A first continuing object of the invention is to provide a wax emulsion that is suitable for use on furniture in which an oil-based wax is combined with a water based polish at a quantity not to exceed one-half of the emulsion containing the oil-based wax.

A second continuing object of the invention is to provide a wax emulsion that is suitable for use on furniture in which an automotive type of a polish is combined with a furniture wax.

A third continuing object of the invention is to provide a wax emulsion that is suitable for use on furniture in which an automotive type of a polish is combined with a furniture type of wax at a quantity not to exceed one-half of the emulsion containing the furniture type of wax.

Briefly, a wax emulsion that is constructed in accordance with the principles of the present invention has a quantity of an oil based carnauba wax or bees wax type of a furniture wax mixed together with a water based automobile type of a polish for use only on furniture. The oil based carnauba wax or bees wax is limited so that it does not exceed one-half of the total volume. The wax and polish are mixed together to form an emulsion. The emulsion is then applied to the furniture and allowed to dry, which it does very quickly, and then rubbed or buffed to a high luster deep finish that embodies the best characteristics of both the waxes and the polish.

BRIEF DESCRIPTION OF THE DRAWING

The FIGURE is a block diagrammatic view of the steps to obtain a wax emulsion.

DETAILED DESCRIPTION OF THE INVENTION

Referring to the FIGURE is shown, a wax emulsion, identified in general by the reference numeral 10.

The wax emulsion 10 is obtained by taking a first quantity of an oil-based furniture wax 12 and a second quantity of a water-based automotive polish 14 and combining them together.

The oil-based furniture wax 12 includes any petroleum, carnauba wax, or bees wax type of furniture wax (or combination thereof). A preferred product for use as the oil-based furniture wax 12 is marketed under the brand name of BRIWAX ORIGINAL and is manufactured by Henry Flack (1860) Ltd. in Beckenham, Kent and imported by Henry Flack International Inc. PO Box 865110, Plano, Tex., 75086-5110, U.S.A. This product is a blend of soft beeswax and a waxy emollient from the carnauba palm.

The water-based automotive polish 14 includes any water based silicone, polymer, or silicon resin type of polish intended for use in polishing an exterior portion (i.e., the painted sheet metal exterior) of an automobile. A preferred product for use as the water-based automotive polish 14 is marketed under the brand name of FINISH 2001 and is manufactured by Turtle Wax, Inc., Chicago, Ill., 60638-6211. This product includes a silicone resin formula that is enriched with urethane.

There is latitude regarding the formulation and it may vary depending upon the particular brands that are combined. In general, the oil-based furniture wax 12 must not exceed one-half of the total volume. As the wax emulsion 10 is intended only for use in waxing furniture, a decreased amount of the oil-based furniture wax 12, one in particular that is less than 50% of the total, would seem contrary to that of common sense. One, after having read the instant disclosure, would still expect that the preponderance of the wax emulsion 10 would be that of the furniture wax 12 if the product is to be used on furniture with possibly only a hint of the automotive polish 14 present. The opposite, surprisingly, is what produces the desired result.

When the currently recited products are used for the furniture wax 12 and the automobile polish 14, a preferred formulation is to not allow the furniture wax 12 to exceed one-third of the total volume. This optimally prevents smearing and yet it is even more counter-intuitive.

However, if more than one-half of the furniture wax 12 is used, the wax emulsion 10 will smudge and streak. If far less than one-third of the furniture wax 12 is used, the wax emulsion 10 will not have sufficient thickness and visual depth when used on furniture, especially on high sheen lacquer finished furniture items.

In the furniture wax industry, oil based waxes are never combined together with water based polishes. It was felt that such a combination would bring into existence an unpredictable product at best and at worst, one that would fail utterly as a furniture wax.

The wax emulsion 10 is obtained by combining the desired quantity of the furniture wax 12 and of the automotive polish 14 together and then using a mixing wand 16 (or automated mixing equipment [not shown] for larger scale) to mix them together so that a uniform wax emulsion 10 is obtained. Accordingly, the furniture wax 12 is distributed evenly and in suspension throughout the automotive polish 14 to provide the wax emulsion 10.

Typically, the furniture wax 12 will remain evenly distributed over a long period of time. If there is any settling that occurs, the instructions provided with the wax emulsion 10 would specify stirring the wax emulsion 10 until it is again properly mixed. If desired, the mixing wand 16 could be included with the product as an aid.

By having the wax emulsion 10 include at least two-thirds of the water based automotive polish 14 and not more than one-third of the furniture wax 12, many benefits are obtained.

The most important is that the resultant finish produced by application of the wax emulsion 10 (as described in greater detail hereinafter) greatly resists smears and smudges. This benefit is readily demonstrable in a comparison of the wax emulsion 10 with the furniture wax 12 where one rubs his or her finger over both finishes.

A second benefit is that the depth of finish of the wax emulsion 10 appears identical to that of the oil-based furniture wax 12 alone. In other words, a benefit (decreased smudging and smearing) is obtained without sacrifice in the quality of the wax finish.

A third benefit is that the resultant finish does not attract dust as would the finish arising from strict use of the oil-based furniture wax 12. The furniture wax 12 apparently leaves a film residue that not only is capable of smudging and smearing, but attracts and retains dust particulants from the air as well.

A fourth benefit is that the wax emulsion 10 is easily applied. This is an especially significant benefit. Use of the furniture wax 12 requires a lot of buffing. The wax emulsion 10 is applied as easily as is the automobile polish 14 to the automobile. Typically a cloth or sponge is contacted with the emulsion 10 and is spread over the article of furniture in a circular motion. A thin film of the wax emulsion 10 is deposited over the article of furniture and quickly dries to a dull sheen. A clean cloth is used to rub over (i.e., buff) the article of furniture which quickly takes on a deep lustrous sheen.

A fifth benefit is that because the resultant finish obtained from using the wax emulsion 10 does not readily smear, smudge, or attract dust, a very long lasting deep highly glossy finish is obtained that appeals to those in furniture showrooms as well as to private residents and also to cleaning services (i.e., maid services).

A sixth benefit is that the resultant finish is adapted for use over virtually all known types of finishes that are applied to furniture items, and in particular over a lacquered finish, which is especially prone to smudging and smearing.

A seventh benefit is that resulting finish provides long term durability of the desired sheen. The sheen produced can last upwards of one year before either a renewed application is necessary or a rebuffing of the existing finish is required. Accordingly, the sheen of the instant invention can outlast by several times the useful life of the sheen of conventional furniture waxes.

As mentioned hereinabove, while the percentages of the furniture wax 12 and the automobile polish 14 can be varied, the furniture wax 12 can never exceed 50% of the total volume.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A method for making a wax emulsion for use on a furniture, comprised of the steps of:
   (a) providing a first quantity of an oil-based furniture wax that includes a quantity of either a carnauba wax or a bees wax;
   (b) providing a second quantity of a water-based automotive polish; and
   (c) mixing said first quantity of said oil-based furniture wax together with said second quantity of said water-based automotive polish.

2. The method of claim 1 including the step of limiting said first quantity so that it does not exceed one-third of the total volume of said wax emulsion.

* * * * *